(12) United States Patent
Oshitani (10) Patent No.: US 8,650,904 B2
(45) Date of Patent: Feb. 18, 2014

(54) EJECTOR-TYPE REFRIGERANT CYCLE DEVICE

(75) Inventor: Hiroshi Oshitani, Toyota (JP)

(73) Assignee: Denso Corporation, Kariya (JP)

( * ) Notice: Subject to any disclaimer, the term of this patent is extended or adjusted under 35 U.S.C. 154(b) by 287 days.

(21) Appl. No.: 13/136,789

(22) Filed: Aug. 10, 2011

(65) Prior Publication Data

US 2012/0042686 A1 Feb. 23, 2012

(30) Foreign Application Priority Data

Aug. 18, 2010 (JP) ................. 2010-183347

(51) Int. Cl.
*F25B 1/00* (2006.01)
(52) U.S. Cl.
USPC ............................................. 62/498; 62/500
(58) Field of Classification Search
USPC .............. 62/500, 228.3, 324.6, 191, 498; 165/908
See application file for complete search history.

(56) References Cited

U.S. PATENT DOCUMENTS

| | | | | |
|---|---|---|---|---|
| 3,701,264 | A  * | 10/1972 | Newton | 62/191 |
| 7,207,186 | B2 * | 4/2007 | Hirota | 62/228.3 |
| 7,690,218 | B2 * | 4/2010 | Ikegami et al. | 62/500 |
| 7,726,150 | B2 * | 6/2010 | Nishijima et al. | 62/500 |
| 7,987,685 | B2 * | 8/2011 | Oshitani et al. | 62/500 |
| 2001/0025499 | A1 | 10/2001 | Takeuchi et al. | |
| 2005/0178150 | A1 | 8/2005 | Oshitani et al. | |
| 2008/0098757 | A1 | 5/2008 | Takeuchi et al. | |

FOREIGN PATENT DOCUMENTS

| | | |
|---|---|---|
| JP | S63-096450 | 4/1988 |
| JP | 2004-301491 | 10/2004 |
| JP | 2009-156520 | 7/2009 |

OTHER PUBLICATIONS

Office Action mailed Jul. 30, 2013 in the corresponding JP application No. 2010-183347 with English translation thereof.

* cited by examiner

*Primary Examiner* — Mohammad M Ali
(74) *Attorney, Agent, or Firm* — Harness, Dickey & Pierce, PLC (57) ABSTRACT

An ejector-type refrigerant cycle device includes a compressor, a radiator, an ejector, a suction side evaporator disposed to evaporate refrigerant to be drawn into a refrigerant suction port of the ejector, and a discharge capacity control portion configured to control a refrigerant discharge capacity of the compressor. The discharge capacity control portion increases the refrigerant discharge capacity of the compressor in accordance with an increase of a requirement capacity required in a refrigerant cycle of a general operation, when the requirement capacity is larger than a standard value. In contrast, when the requirement capacity required in the refrigerant cycle is equal to or smaller than the standard value, the discharge capacity control portion controls the refrigerant discharge capacity of the compressor to be switched alternately between a high capacity operation and a low capacity operation. Thus, a refrigerant circulation amount in the refrigerant cycle can be suitably adjusted.

9 Claims, 7 Drawing Sheets

EJECTOR-TYPE REFRIGERANT CYCLE DEVICE

CROSS REFERENCE TO RELATED APPLICATION

This application is based on Japanese Patent Application No. 2010-183347 filed on Aug. 18, 2010, the contents of which are incorporated herein by reference in its entirety.

TECHNICAL FIELD

The present invention relates to an ejector-type refrigerant cycle device, which has an ejector.

BACKGROUND

Conventionally, an ejector-type refrigerant cycle device having an ejector, provided with functions of a refrigerant decompression means and a refrigerant circulating means, is known. For example, Patent Documents 1-3 describe regarding an ejector-type refrigerant cycle device, in which refrigerant discharged from a compressor is cooled by performing heat exchange with outside air in a radiator, and the cooled high-pressure refrigerant is decompressed in a nozzle portion of an ejector.

For example, in an ejector-type refrigerant cycle device of Patent Document 1 (JP Patent No. 3322263 B1 corresponding to US 2001/0025499 A1), a gas-liquid separator is arranged at a downstream side of a diffuser portion of an ejector to separate low-pressure refrigerant into gas refrigerant and liquid refrigerant. Furthermore, a gas refrigerant outlet of the gas-liquid separator is connected to a refrigerant suction port of the compressor so that gas refrigerant separated in the gas-liquid separator is drawn to the compressor, and a liquid refrigerant outlet of the gas-liquid separator is connected to a refrigerant inlet of a suction side evaporator so that liquid refrigerant separated in the gas-liquid separator is evaporated in the suction side evaporator and the evaporated refrigerant is drawn into the ejector from a refrigerant suction port of the ejector.

In an ejector-type refrigerant cycle device of Patent Document 2 (JP Patent No. 3931899 B2 corresponding to US 2005/0178150 A1), a branch portion is provided at an upstream side of a nozzle portion of an ejector to branch a flow of the refrigerant flowing out of a radiator. Furthermore, the branch portion is provided, such that one refrigerant branched at the branch portion flows toward the nozzle portion of the ejector, and the other refrigerant branched at the branch portion flows toward a refrigerant suction port of the ejector via a suction side evaporator.

In an ejector-type refrigerant cycle device of Patent Document 3 (JP 2008-107055A corresponding to US 2008/0098757 A1), a branch portion is provided at a downstream side of a diffuser portion of an ejector to branch a flow of the refrigerant flowing out of the diffuser portion. Furthermore, the branch portion is provided, such that one refrigerant branched at the branch portion flows toward a compressor via a discharge side evaporator, and the other refrigerant branched at the branch portion flows toward a refrigerant suction port of the ejector via a suction side evaporator.

In the ejector adopted to the above ejector-type refrigerant cycle devices, refrigerant is decompressed and expanded in the nozzle portion of the ejector in iso-entropy, and the refrigerant downstream of the suction side evaporator is drawn into the ejector from the refrigerant suction port by the refrigerant suction action due to a high-speed refrigerant jetted from a jet port of the nozzle portion, thereby recovering the loss of the kinetic energy in the decompression and expansion of the nozzle portion.

By converting the recovered kinetic energy to the pressure energy in the diffuser portion of the ejector, the pressure of the suction refrigerant of the compressor can be increased, thereby reducing the driving power of the compressor and improving the coefficient of performance (COP) in the ejector-type refrigerant cycle device.

In the above refrigerant cycle device, the refrigerant flowing out of the suction side evaporator is drawn into the ejector from the refrigerant suction port, so as to improve the COP. Thus, in order to improve the COP due to the ejector, it is necessary to sufficiently draw the refrigerant flowing out of the suction side evaporator from the refrigerant suction port of the ejector by using the refrigerant suction action.

Furthermore, in the ejector-type refrigerant cycle device, it is necessary to suitably adjust a refrigerant circulation amount in accordance with a cooling capacity or a heating capacity required in the ejector-type refrigerant cycle device.

However, if a refrigerant discharge capacity of a compressor is reduced in accordance with the cooling capacity or the heating capacity required in the refrigeration cycle device, a pressure difference between a refrigerant pressure at a refrigerant inlet side of the nozzle portion of the ejector and a refrigerant pressure at a refrigerant outlet side of the nozzle portion of the ejector is reduced, thereby reducing a flow speed of the jet refrigerant jetted from the nozzle portion. As a result, it is difficult to sufficiently draw the refrigerant flowing out of the suction side evaporator from the refrigerant suction port of the ejector, and thereby it is difficult to effectively improve the COP by using the ejector.

SUMMARY

In view of the foregoing matters, it is an object of the present invention to provide an ejector-type refrigerant cycle device, which can effectively improve coefficient of performance (COP) without depending on a requirement capacity required in a refrigerant cycle.

According to an aspect of the present invention, an ejector-type refrigerant cycle device includes: a compressor configured to compress and discharge refrigerant; a radiator disposed to cool the refrigerant discharged from the compressor; an ejector that includes a nozzle portion in which the refrigerant flowing from the radiator is decompressed, a refrigerant suction port from which refrigerant is drawn by a high-speed refrigerant jetted from the nozzle portion, and a pressure increasing portion in which the refrigerant jetted from the nozzle portion and the refrigerant drawn from the refrigerant suction portion are mixed and pressurized; a suction side evaporator disposed to evaporate the refrigerant to be drawn into the refrigerant suction port of the ejector; and a discharge capacity control portion configured to control a refrigerant discharge capacity of the compressor. The discharge capacity control portion increases the refrigerant discharge capacity of the compressor in accordance with an increase of a requirement capacity required in a refrigerant cycle of a general operation, when the requirement capacity is larger than a standard value. In contrast, when the requirement capacity required in the refrigerant cycle is equal to or smaller than the standard value, the discharge capacity control portion controls the refrigerant discharge capacity of the compressor to be switched alternately between a high capacity operation in which the refrigerant discharge capacity of the compressor is larger than a predetermined discharge capacity that is determined at the standard value of the requirement capacity in the general operation, and a low capacity operation in which the refrigerant discharge capacity of the compressor is lower than the predetermined discharge capacity.

Thus, even when the requirement capacity required in the refrigerant cycle is equal to or lower than the standard value, the COP of the ejector-type refrigerant cycle device can be effectively increased by using the ejector, regardless of the requirement capacity of the refrigerant cycle. For example, the requirement capacity of the refrigerant cycle is a cooling capacity when the ejector-type refrigerant cycle device is used for cooling a fluid to be cooled, or the requirement capacity of the refrigerant cycle is a heating capacity when the ejector-type refrigerant cycle device is used for heating a fluid to be heated. Furthermore, the refrigerant discharge capacity of the compressor may be controlled by controlling an operation time of the compressor or an operation ratio of the compressor, for example.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF THE PREFERRED EMBODIMENTS

First Embodiment

Figure 1:
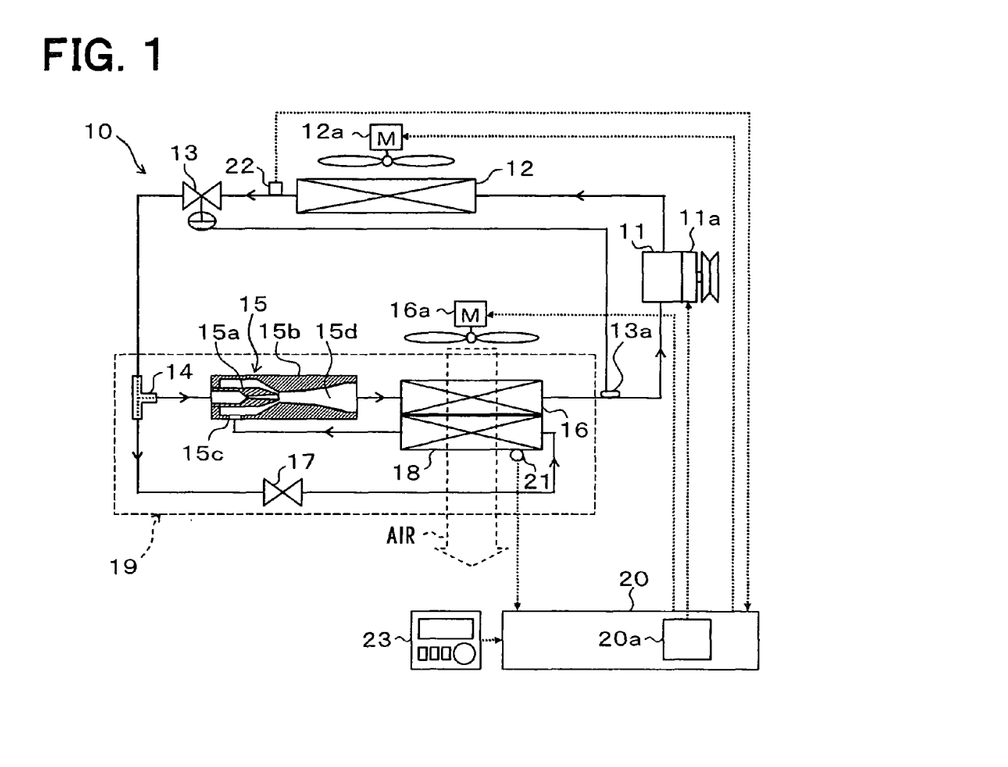
FIG. 1 is an entire schematic diagram of an ejector-type refrigerant cycle device according to a first embodiment of the invention.

A first embodiment of the invention will be described below with reference to FIGS. 1 to 6. FIG. 1 is an entire schematic diagram of an ejector-type refrigerant cycle device 10 of the present embodiment. The ejector-type refrigerant cycle device 10 is adapted to heat or cool air to be blown into a vehicle compartment that is a space to be air-conditioned in a vehicle air conditioner. Thus, in this case, a required capacity required in the ejector-type refrigerant cycle device 10 is a cooling capacity for cooling air to be blown into the vehicle compartment, as an example.

In the ejector-type refrigerant cycle device 10, the compressor 11 is configured to draw refrigerant and to compress the drawn refrigerant. The compressor 11 is rotated and driven by a drive force from an engine (not shown) for a vehicle traveling. As the compressor 11, a variable displacement compressor may be used, in which the discharge capacity is continuously changeable based on a control signal from an exterior.

As an example, the compressor 11 of the present embodiment includes a compression mechanism of a swash-plate displacement variable type, in which a slant angle of a swash plate is changed by changing a control pressure Pc in a swash plate chamber so that a stroke of a piston connected to the swash plate is changed. Thus, the refrigerant discharge capacity of the compressor 11 can be continuously changed by changing the stroke of the piston connected to the swash plate. Here, the refrigerant discharge capacity of the compressor 11 corresponds to a geometric capacity of an operation space for performing suction and compression of refrigerant. That is, the refrigerant discharge capacity corresponds to a cylinder capacity between a top dead point and a bottom dead point of the piston stroke.

The control pressure Pc of the swash plate chamber of the compressor 11 is changed by changing a valve open degree of an electromagnetic capacity control valve 11a. That is, a ratio between a discharge refrigerant amount and a suction refrigerant amount introduced into the swash plate chamber, so that the control pressure Pc of the swash plate chamber can be adjusted. The operation of the electromagnetic capacity control valve 11a is controlled by a control current output from an air conditioning controller 20.

A refrigerant radiator 12 is connected to a refrigerant discharge side of the compressor 11. The radiator 12 is a heat-radiation heat exchanger in which high-temperature and high-pressure refrigerant discharged from the compressor 11 is heat-exchanged with outside air (i.e., air outside of the vehicle compartment) blown by a cooling fan 12a, thereby cooling the high-pressure refrigerant. The cooling fan 12a is an electrical fan, in which its rotational speed (air blowing amount) is controlled by a control voltage output from the air conditioning controller 20.

In the present embodiment, a flon-based refrigerant is used as the refrigerant for a refrigerant cycle of the ejector-type refrigerant cycle device 10 to form a vapor-compression subcritical refrigerant cycle in which a refrigerant pressure on the high-pressure side, discharged from the compressor 11 and before being decompressed, does not exceed the critical pressure of the refrigerant. Thus, the radiator 12 is adapted as a condenser in which the refrigerant is cooled and condensed. Furthermore, a refrigerator oil is mixed to the refrigerant in order to lubricate the compressor 11, so that the refrigerator oil is circulated in the refrigerant cycle together with the refrigerant.

An expansion valve 13 as a variable throttle mechanism is connected to a refrigerant outlet side of the radiator 12. The expansion valve 13 is adapted as a decompression means for decompressing the high-pressure refrigerant flowing out of the radiator 12 into a middle pressure of a gas-liquid two-phase state, and is also adapted as a flow adjusting means for adjusting a flow amount of the refrigerant flowing toward downstream of the expansion valve 13.

In the present embodiment, a thermal expansion valve is used as the expansion valve 13. Specifically, the thermal expansion valve 13 has a temperature sensing portion 13a arranged in a refrigerant passage at a refrigerant outlet side of a discharge side evaporator 16 described later. The thermal expansion valve 13 is a variable throttle mechanism, in which a super-heat degree of the refrigerant at the refrigerant outlet side of the discharge side evaporator 16 is detected based on temperature and pressure of the refrigerant at the refrigerant outlet side of the discharge side evaporator 16, and its valve-open degree (refrigerant flow amount) is adjusted by using a mechanical mechanism so that the super-heat degree of the refrigerant at the refrigerant outlet side of the discharge side evaporator 16 is approached to a predetermined value.

A branch portion 14 is connected to a refrigerant outlet side of the expansion valve 13, to branch the flow of a gas-liquid middle-pressure refrigerant decompressed and expanded by the expansion valve 13. For example, the branch portion. 14 is a three-way joint structure having three ports that are used as one refrigerant inlet and two refrigerant outlets. The branch portion 14 may be configured by bonding plural pipes, or may be configured by providing plural refrigerant passages in a metal block member or a resin block member.

One of the two refrigerant outlets of the branch portion 14 is connected to a refrigerant inlet side of a nozzle portion 15a of the ejector 15, and the other one of the two refrigerant outlets of the branch portion 14 is connected to a refrigerant inlet side of the throttle mechanism 17.

In the present embodiment, the refrigerant passage area and the refrigerant passage shape of the branch portion 14 are set, so as to set a flow ratio of a flow amount of the refrigerant flowing toward the nozzle portion 15a and a flow amount of the refrigerant flowing toward the throttle mechanism 17, and to set a refrigerant state flowing toward the nozzle portion 15a and the throttle mechanism 17. That is, the refrigerant passage area and the refrigerant passage shape of the branch portion 14 are set so as to improve the coefficient of performance in the entire cycle.

By adjusting a ratio of the refrigerant passage areas at both the refrigerant outlet sides of the branch portion 14, the flow ratio between the flow amount of the refrigerant flowing toward the nozzle portion 15a and the flow amount of the refrigerant flowing toward the throttle mechanism 17 can be adjusted. Furthermore, the flow directions of the refrigerant flowing out of the respective refrigerant outlets of the branch portion 14 are adjusted with respect to the flow direction of the refrigerant flowing into the refrigerant inlet of the branch portion 14, so that the refrigerant state flowing toward the nozzle portion 15a from the branch portion 14 and the refrigerant state flowing toward the throttle mechanism 17 from the branch portion 14 can be adjusted.

The ejector 15 is adapted as a refrigerant decompression means for decompressing and expanding a middle-pressure refrigerant branched at the branch portion 14 to a low-pressure refrigerant, and as a refrigerant circulation means for circulating the refrigerant by the suction action of a high-speed refrigerant flow jetted from the nozzle portion 15a.

The ejector 15 of the embodiment is configured to have the nozzle portion 15a and the body portion 15b. First, the nozzle portion 15a is formed from an approximately cylindrical member made of a metal (for example, brass, a stainless alloy). As shown in FIG. 1, the nozzle portion 15a is formed in a taper shape tapered from a throat portion toward a refrigerant flow direction. The refrigerant passage area inside of the nozzle portion 15a is configured so that the refrigerant is decompressed in iso-entropy.

The refrigerant passage formed inside of the nozzle portion 15a has the throat portion in which the refrigerant passage area becomes smallest, and an expansion portion in which the refrigerant passage area is gradually increased from the throat portion to the refrigerant jet port. That is, the nozzle portion 15a is configured by a Laval nozzle that is configured such that the flow speed of the refrigerant flowing in the throat portion becomes equal to or larger than the sound speed. The nozzle portion 15a may be configured by a taper nozzle.

The body 15b is formed from an approximately cylindrical metal (e.g., aluminum). The body 15b is adapted as a fixing member for supporting and fixing the nozzle portion 15a therein, and defines an outer shell of the ejector 15. Specifically, the nozzle portion 15a is fitted and fixed into one end side of the body 15b in a longitudinal direction. Thus, it can prevent the refrigerant from being leaked from the fixing portion between the nozzle portion 15a and the body 15b.

The refrigerant suction port 15c is formed in an outer peripheral surface of the body 15b at a position corresponding to an outer peripheral side of the nozzle portion 15a, so that the refrigerant suction port 15c communicates with the refrigerant jet port of the nozzle portion 15a via a refrigerant suction passage between the nozzle portion 15a and the body 15b. The refrigerant suction port 15c is a through hole provided to penetrate through the wall portion of the body 15b from the interior to the exterior of the body 15b. The refrigerant suction port 15c is provided such that the refrigerant flowing out of the suction side evaporator 18 is drawn into the ejector 15 inside of the body 15b, by a suction action caused due to the refrigerant jetted from the nozzle portion 15a.

Within the body 15b, there is provided with the refrigerant suction passage through which the refrigerant drawn from the refrigerant suction port 15c is introduced into the diffuser portion 15d, so that the refrigerant jetted from the nozzle portion 15a and the refrigerant drawn from the refrigerant suction port 15c via the suction passage are mixed and pressurized in the diffuser portion 15d. Therefore, the diffuser portion 15d provided in the body 15b is adapted as a mixing portion and a pressure increasing portion.

The suction passage is provided by using a space between an outer peripheral surface of the tapered nozzle portion 15a and an inner peripheral surface of the body 15b, and the refrigerant passage area of the suction passage is gradually reduced as toward downstream in a refrigerant flow direction from the refrigerant suction port 15c. Thus, the flow speed of the refrigerant flowing through the suction passage in the body 15b can be gradually increased, thereby reducing the energy loss caused while the suction refrigerant and the jet refrigerant are mixing in the diffuser portion 15d.

The diffuser portion 15d is provided to communicate with an outlet of the suction passage around the jet port of the nozzle portion 15a, such that the refrigerant passage area is gradually enlarged toward the outlet of the diffuser portion 15d. In the diffuser portion 15d, the jet refrigerant jetted from the nozzle portion 15a and the suction refrigerant from the suction passage are mixed and pressurized, so that the speed energy of the mixed refrigerant is converted to the pressure energy.

The discharge side evaporator 16 is connected to the refrigerant outlet side of the diffuser portion 15d. The discharge side evaporator 16 is a heat exchanger, in which the refrigerant flowing out of the diffuser portion 15d is heat-exchanged with air blown by a blower fan 16a, so that the refrigerant is evaporated by absorbing heat from air. The blower fan 16a is an electrical blower in which the rotational speed (air blowing amount) is controlled by a control voltage output from an air conditioning controller 20. The refrigerant outlet of the discharge side evaporator 16 is coupled to a refrigerant suction port of the compressor 11.

The throttle mechanism 17 is connected to the other refrigerant outlet of the branch portion 14. The throttle mechanism 17 is adapted as a decompression means for decompressing the refrigerant flowing into the suction side evaporator 18, and is also adapted as a flow adjusting means for adjusting a flow amount of the refrigerant flowing into the suction side evaporator 18. As the throttle mechanism 17, a fixed throttle such as a capillary tube, an orifice or the like can be used.

The suction side evaporator 18 is configured to perform heat exchange between the refrigerant flowing out of the throttle mechanism 17 and air blown by the blower fan 16$a$ and having passed through the discharge side evaporator 16, and is adapted as a heat-absorbing heat exchanger in which the refrigerant is evaporated so as to exert heat-absorbing action. The refrigerant suction port 15$c$ of the ejector 15 is connected to a refrigerant outlet side of the suction side evaporator 18.

In the ejector-type refrigerant cycle device 10 of the present embodiment, the branch portion 14, the ejector 15, the discharge side evaporator 16, the throttle mechanism 17 and the suction side evaporator 18 which are enclosed by the chain line in FIG. 1 are integrally configured as an evaporator unit 19.

More specifically, as the discharge side evaporator 16 and the suction side evaporator 18, a tank-and-tube type heat exchanger may be used. For example, the discharge side evaporator 16 includes a plurality of tubes in which the refrigerant flows, and a pair of tanks arranged at two end sides of the tubes to distribute the refrigerant into the tubes and to join the refrigerant from the tubes.

The evaporators 16, 18 may be formed to have common tanks so that the evaporators 16, 18 are integrated through the common tanks. The evaporators 16, 18 are arranged in series in an air flow direction, such that the discharge side evaporator 16 is arranged upstream of the suction side evaporator 18 with respect to the air flow direction. Thus, as shown in FIG. 1, air blown by the blower fan 16$a$ flows through the discharge side evaporator 16 and the suction side evaporator 18 in this order, so that air is cooled by both the discharge side evaporator 16 and the suction side evaporator 18.

For example, the ejector 15 is arranged in a tank of the evaporators 16, 18 or a separation tank, such that a longitudinal direction of the ejector 15 is parallel with a longitudinal direction of the tank of the evaporator 16, 18 or the separation tank. The elector 15 is bonded to the tank of the evaporators 16, 18 or the separation tank to be integrated thereto. The branch portion 14 and the throttle mechanism 17 are integrated to the evaporators 16, 18 by using a generally known bonding means or a mechanical means.

Next, an electrical control portion of the present embodiment will be described. The air conditioning controller 20 includes a microcomputer, an output circuit, an input circuit and an electrical circuit. The microcomputer is a generally known one including a CPU for performing a control process or a calculation process, an ROM for storing a program or data, an RAM and the like. The output circuit is configured to output a control signal or a control voltage to the various components to be controlled, and the input circuit is configured such that the detection signals of various sensors are input to the input circuit.

The various components to be controlled, such as the electromagnetic capacity control valve 11$a$ of the compressor 11, the cooling fan 12$a$, the blower fan 16$a$ or the like, are connected to the output side of the air conditioning controller 20.

The air conditioning controller 20 is configured to have control portions, which controls the various components.

In the present embodiment, the operation of the electromagnetic capacity control valve 11$a$ of the compressor 11 is controlled by a discharge capacity control portion 20$a$ of the air conditioning controller 20 configured with the hardware and software, thereby controlling the refrigerant discharge capacity of the compressor 11. The discharge capacity control portion 20$a$ may be configured separately from the air conditioning controller 20.

Air conditioning sensor group and an air conditioning operation panel 23 are connected to an input side of the air conditioning controller 20. For example, the air conditioning sensor group includes an inside air sensor configured to detect a temperature Tr inside of the vehicle compartment, an outside air temperature sensor configured to detect an outside air temperature, a solar sensor configured to detect a solar radiation of the vehicle compartment, an evaporator temperature sensor 21 configured to detect an air temperature (evaporator temperature) blown from the suction side evaporator 18, and the like. The air temperature blown from the suction side evaporator 18 is one example of an evaporator temperature.

In the present embodiment, the evaporator temperature sensor 21 is disposed to detect a fin temperature of a heat exchanging portion of the suction side evaporator 18. A high-pressure refrigerant is discharged from the refrigerant discharge port of the compressor 11, and is introduced into the refrigerant inlet of the expansion valve 13 after passing through the radiator 12. A high pressure sensor 22 is disposed in a refrigerant passage from a refrigerant outlet of the radiator 12 to a refrigerant inlet of the expansion valve 13 to detect a refrigerant pressure of a high-pressure side refrigerant before being decompressed.

Figure 2:
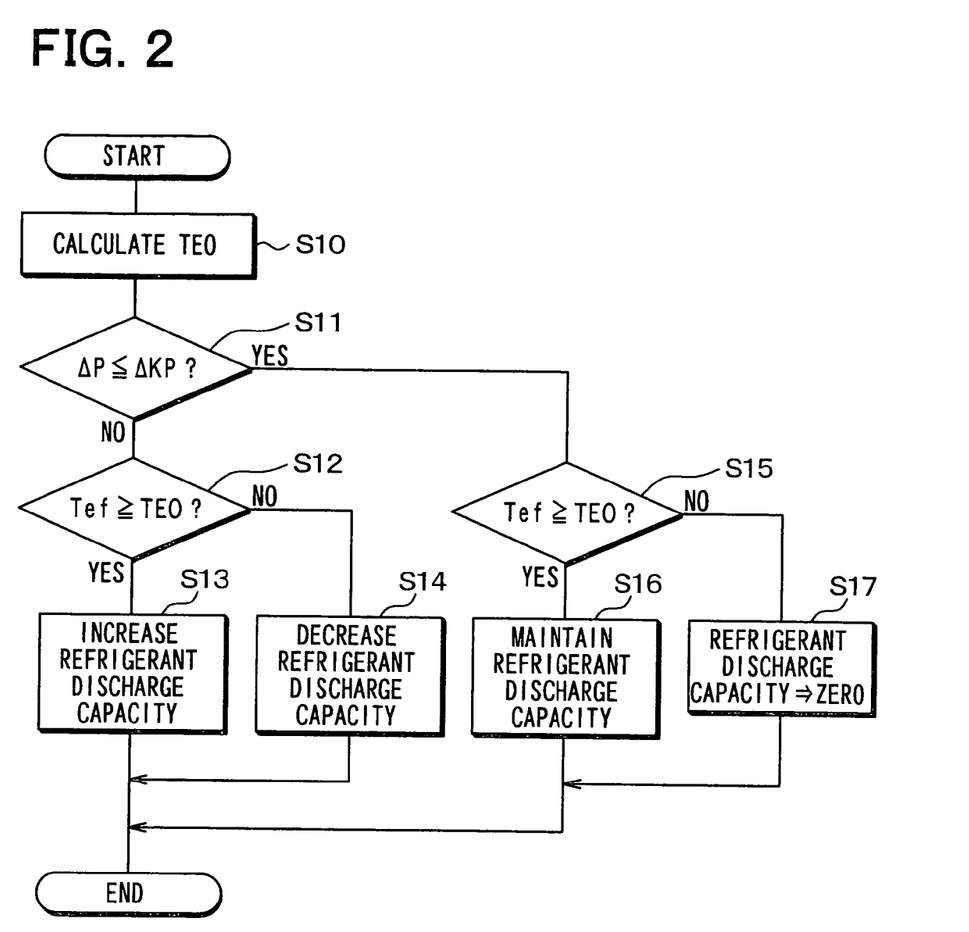
FIG. 2 is a flow diagram showing a part of the control process of the ejector-type refrigerant cycle device according to the first embodiment.

Next, operation of the above-described ejector-type refrigerant cycle device 10 of the present embodiment will be described with reference to FIGS. 2 to 6. The flow diagram of FIG. 2 shows a part of control process performed by the air conditioning controller 20. The air conditioning controller. 20 controls the air conditioning control process when the operation switch of the air conditioning operation panel 23 is turned on.

In a man routine of the air conditioning control process of the air conditioning controller 20, the detection signals from the air conditioning sensor group and operation signals from the air conditioning operation panel 23 are read, control states of the various equipments are determined, and control signals for controlling the various equipments are output. The main routine of the air conditioning control process are repeated by every control period.

The control state of the electromagnetic capacity control valve 11$a$ of the compressor 11 is determined based on the flow diagram of FIG. 2. At step S10, a target evaporator temperature TEO is calculated as a target value of the air temperature blown from the suction side evaporator 18 in accordance with a control map stored in a memory circuit, based on the detection signals of the air-conditioning sensor group and operation signals of the air conditioning operation panel 23.

The target evaporator temperature TEO indicates a cooling degree of air cooled by the evaporator unit 19. When the target evaporator temperature TEO is decreased, it is necessary to increase the cooling capacity required in the ejector-type refrigerant cycle device 10.

For example, in order to decrease the temperature of air blown from the evaporator unit 19, it is necessary to increase the refrigerant discharge capacity of the compressor 11, thereby reducing the refrigerant evaporation temperature in the evaporators 16, 18. At step S10, the target evaporator temperature TEO is calculated and determined such that the refrigerant discharge capacity of the compressor 11 is increased in accordance with an increase of the requirement capacity (e.g., cooling capacity, heating capacity) required in the ejector-type refrigerant cycle device 10.

Next, at step S11, it is determined whether a pressure difference ΔP(Pd−Pef) is equal to or lower than a predetermined pressure difference ΔKP. Here, the pressure difference ΔP is a difference between a detection value Pd of the high pressure sensor 22 and a refrigerant evaporation pressure Pef in the suction side evaporator 18. The refrigerant evaporation pressure Pef is calculated from a detection value Te of the evaporator temperature sensor 21.

When the refrigerant discharge capacity of the compressor 11 is decreased in accordance with a decrease of the required capacity (e.g., cooling capacity), the pressure difference ΔP(Pd−Pef) adapted at step S11 is decreased. Therefore, the pressure difference ΔP(Pd−Pef) is an example of an index for indicating the requirement capacity required in the refrigerant cycle device 10. At step S11, it is determined whether the pressure difference ΔP(Pd−Pef) is equal to or smaller than the predetermined pressure difference ΔKP, thereby determining whether the required cooling capacity is equal to or smaller than a predetermined cooling capacity.

When the pressure difference ΔP(Pd−Pef) is reduced, a pressure difference between the refrigerant pressure at the refrigerant inlet side of the nozzle portion 15a of the ejector 15 and the refrigerant pressure at the refrigerant jet port of the nozzle portion 15a is reduced, thereby reducing the flow speed of the jet refrigerant jetted from the nozzle portion 15a. When the pressure difference ΔP(Pd−Pef) is reduced, the suction capacity of the ejector 15 may be reduced. In the present embodiment, the predetermined pressure difference ΔKP is set such that a necessary capacity (e.g., necessary cooling capacity) necessary in the ejector-type refrigerant cycle device 10 can be obtained.

At step S11, when the pressure difference ΔP(Pd−Pef) is larger than the predetermined pressure difference ΔKP, it is determined that the required capacity is larger than a standard capacity. In this case, at step S12, it is determined whether the detection value Tef of the evaporator temperature sensor 21 is equal to or larger than the target evaporator temperature TEO (Tef≧TEO) in the general operation.

When the detection value Tef of the evaporation temperature sensor 21 is equal to or larger than the target evaporator temperature TEO at step S12, a control signal is output to the electromagnetic capacity control valve 11a so that the refrigerant discharge capacity of the compressor 11 is increased by a predetermined capacity.

When the detection value Tef of the evaporation temperature sensor 21 is smaller than the target evaporator temperature TEO at step S12, a control signal is output to the electromagnetic capacity control valve 11a so that the refrigerant discharge capacity of the compressor 11 is decreased by a predetermined capacity.

The control process at steps S12 to S14 are performed in a general operation where the requirement capacity required in the ejector-type refrigerant cycle device 10 is larger than the standard value. That is, in the general operation, the control process of steps S12 to S14 is performed.

At step S11, when the pressure difference ΔP(Pd−Pef) is equal to or smaller than the predetermined pressure difference ΔKP, it is determined that the requirement capacity required in the refrigerant cycle device 10 is equal to or smaller than a standard value. In this case, at step S15, it is determined whether the detection value Tef of the evaporator temperature sensor 21 is equal to or larger than the target evaporator temperature TEO (Tef≧TEO).

When the detection value Tef of the evaporation temperature sensor 21 is equal to or larger than the target evaporator temperature TEO at step S15, a control signal outputted to the electromagnetic capacity control valve 11a of the compressor 11 is maintained at a high value so that the refrigerant discharge capacity of the compressor 11 is maintained.

When the detection value Tef of the evaporation temperature sensor 21 is smaller than the target evaporator temperature TEO at step S15, a control signal is output to the electromagnetic capacity control valve 11a so that the refrigerant discharge capacity of the compressor 11 approximately becomes zero. In this case, the cooling capacity cannot be obtained by the operation of the compressor 11.

As described above, in a case where the requirement capacity required in the refrigerant cycle device 10 is smaller than the standard value (ΔP≦ΔKP), when the cooling capacity of the evaporator unit 19 is equal to or larger than the target cooling capacity (TEO) at step S15, the cooling capacity is maintained at a high capacity without changing the refrigerant discharge capacity of the compressor 11. In contrast, when the required cooling capacity is smaller than the target cooling capacity (TEO) at step S15, the cooling capacity is reduced to a low capacity by setting the refrigerant discharge capacity at approximately zero.

As described at steps S16, S17, in a case where the requirement capacity required in the refrigerant cycle device 10 is equal to or lower than the standard capacity, if the high capacity operation of the compressor 11 is performed, the detection value Tef of the evaporator temperature sensor 21 is decreased, thereby switching from the high capacity operation to the low capacity operation. In a case where the requirement capacity required in the refrigerant cycle device 10 is equal to or lower than the standard capacity, if the low capacity operation of the compressor 11 is performed, the detection value Tef of the evaporator temperature sensor 21 is increased, thereby switching from the low capacity operation of the compressor 11 to the high capacity operation of the compressor 11.

Thus, in the control of steps S15 to S17 in which the requirement capacity is equal to or lower than the standard value, it is possible to selectively switching an operation of the compressor 11 between the high capacity operation and the low capacity operation. When the high capacity operation and the low capacity operation are switched at step S15 to 17, the switching is performed after the high capacity operation or the low capacity operation is continued for a predetermined time period (e.g., 3-5 seconds).

Figure 3:
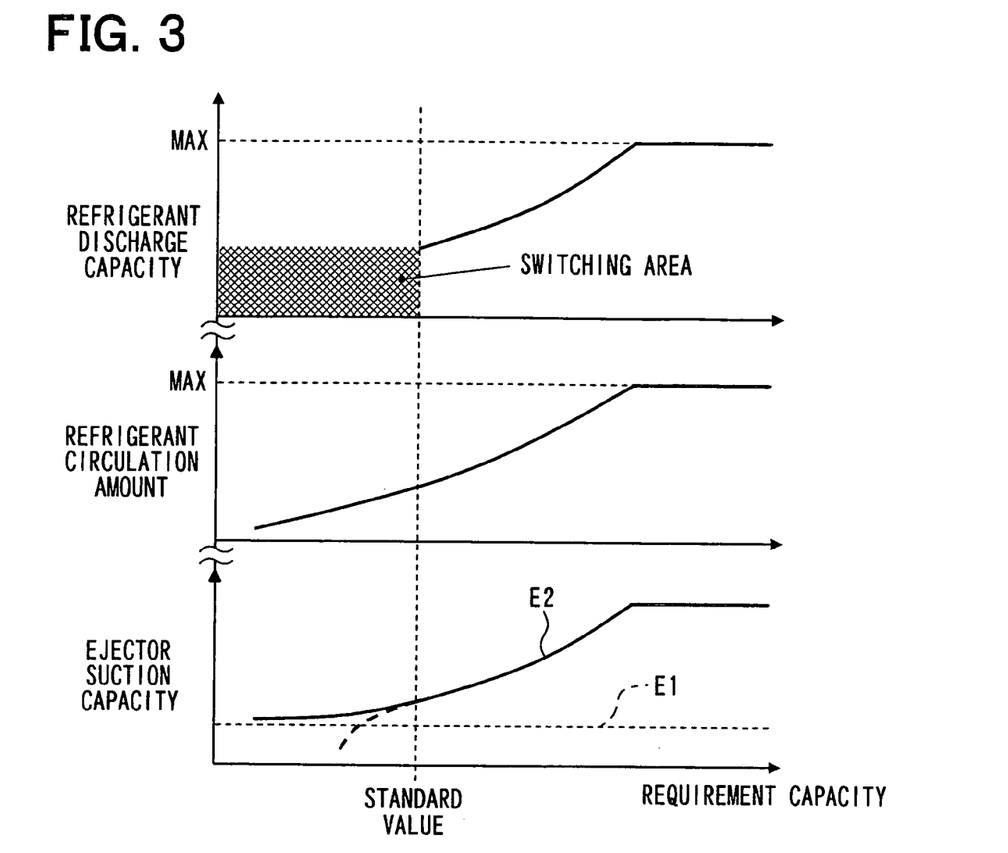
FIG. 3 is a graph showing a refrigerant discharge capacity, a refrigerant circulation amount and a refrigerant suction capacity of an ejector, with respect to variation in a required capacity in the ejector-type refrigerant cycle device, according to the first embodiment.
Figure 4:
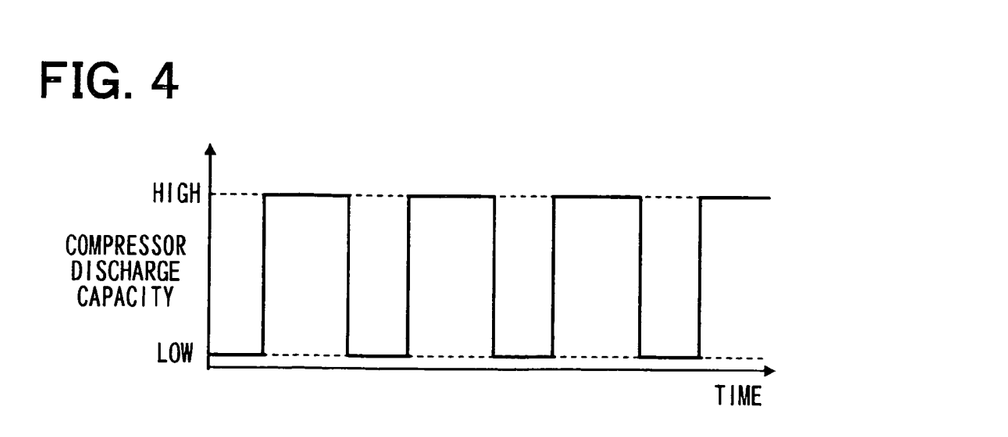
FIG. 4 is a timechart showing variation in a refrigerant discharge capacity of a compressor when being switched between a high capacity operation and a low capacity operation, according to the first embodiment.

In the control process of FIG. 2, the refrigerant discharge capacity of the compressor 11, the refrigerant circulation amount in the ejector-type refrigerant cycle device 10 and the refrigerant suction capacity in the ejector 15 are changed as shown in FIG. 3. The refrigerant discharge capacity of the compressor 11, the refrigerant circulation amount circulating in the cycle and the refrigerant suction capacity of the ejector 15 are changed based on the required capacity required in the ejector refrigerant cycle device 10, as shown in FIG. 3.

When the required capacity is equal to or smaller than the standard value in the refrigerant cycle device 10, the refrigerant discharge capacity of the compressor 11 is increased to the maximum refrigerant discharge capacity in accordance with the required capacity (e.g., cooling capacity). Thus, in accordance with the increase of the required cooling capacity, the refrigerant discharge capacity of the compressor 11 is increased to the maximum refrigerant discharge capacity.

In the switching area of FIG. 3 indicated by meshing, the refrigerant discharge capacity of the compressor 11 is switched between the high capacity operation and the low capacity operation. In accordance with a decrease of the required capacity, a ratio of the operation time of the low capacity operation of the compressor 11 to the operation time of the high capacity operation of the compressor 11 is increased, thereby reducing the refrigerant circulation flow amount in the refrigerant cycle device 10.

Figure 5:
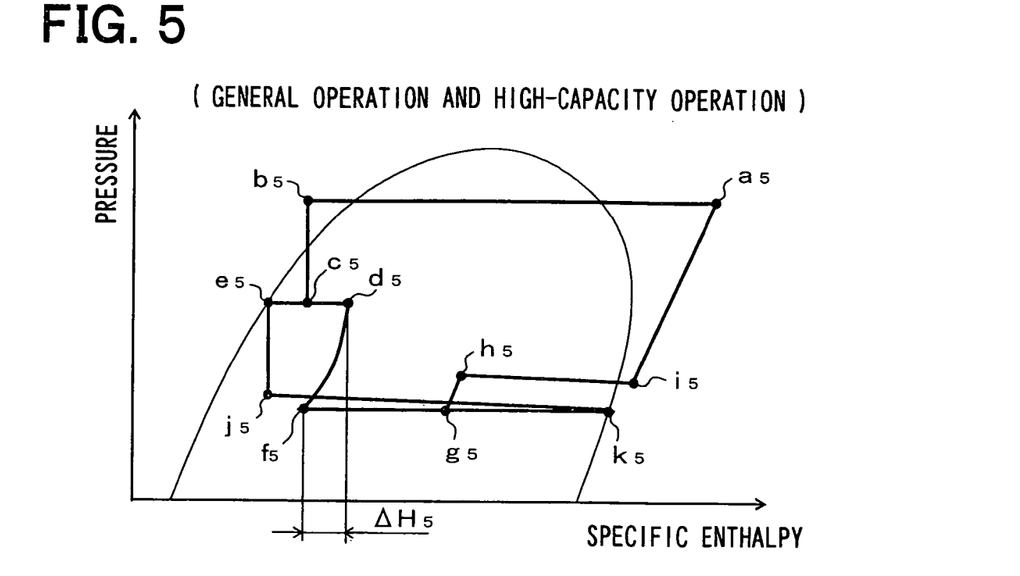
FIG. 5 is a Mollier diagram showing refrigerant states of a refrigerant cycle in a general operation and a refrigerant cycle in a high capacity operation, according to the first embodiment.
Figure 6:
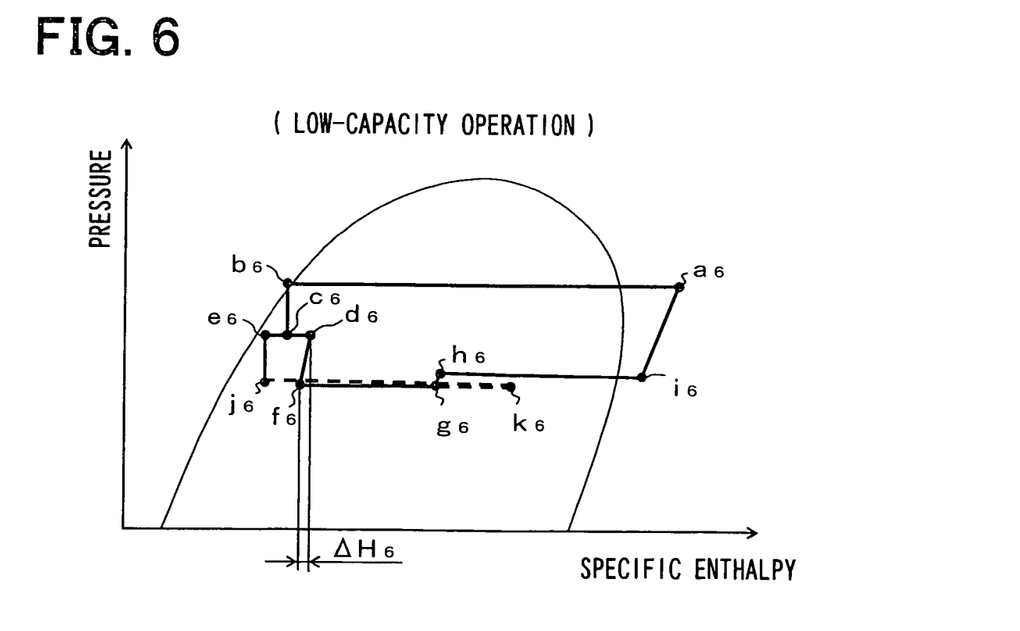
FIG. 6 is a Mollier diagram showing a refrigerant state of a refrigerant cycle in a low capacity operation, according to the first embodiment.

In the present embodiment, because the refrigerant discharge capacity of the compressor 11 is determined as described above, the refrigerant state of the refrigerant cycle in the ejector-type refrigerant cycle device 10 are changed as in the Mollier diagram shown in FIGS. 5 and 6. FIG. 5 is a Mollier diagram showing refrigerant states of a refrigerant cycle in a general operation and a high capacity operation, and FIG. 6 is a Mollier diagram showing refrigerant states in a low capacity operation of the refrigerant cycle, according to the embodiment.

In the general operation mode and the high capacity operation mode, high-temperature and high-pressure refrigerant ($a_5$ in FIG. 5) discharged from the compressor 11 flows into the radiator 12, and is heat-exchanged with the blown air (outside air) blown by the cooling fan 12a to be radiated and condensed at the radiator 12 (point $a_5 \rightarrow$point $b_5$ in FIG. 5).

The high-pressure refrigerant flowing out of the radiator 12 flows into the expansion valve 13 and is reduced in pressure and expanded to a middle-pressure refrigerant in iso-enthalpy (point $b_5 \rightarrow$point $c_5$ in FIG. 5). At this time, the valve open degree of the thermal expansion valve 13 is adjusted so that a super heat degree of the refrigerant at the refrigerant outlet side of the discharge side evaporator 16 becomes a predetermined value (point $i_5$ in FIG. 5).

The middle-pressure refrigerant decompressed and expanded by the expansion valve 13 flows into the branch portion 14, and is branched by the branch portion 14 into a flow of the refrigerant flowing into the nozzle portion 15a and a flow of the refrigerant flowing into the suction side pipe 15b. In the present embodiment, the refrigerant passage area and the refrigerant passage shape of the branch portion 14 are set, so as to set a flow ratio of a flow amount of the refrigerant flowing toward the nozzle portion 15a and a flow amount of the refrigerant flowing toward the throttle mechanism 17, and a refrigerant state flowing toward the nozzle portion 15a and a refrigerant state flowing toward the throttle mechanism 17. That is, the refrigerant passage area and the refrigerant passage shape of the branch portion 14 are set so as to improve the coefficient of performance in the entire cycle.

More specifically, the branch portion 14 is configured such that a dryness of the refrigerant (point $d_5$ of FIG. 5) flowing toward the nozzle portion 15a becomes higher than a dryness of the refrigerant (point $e_5$ of FIG. 5) flowing toward the throttle mechanism 17.

Middle-pressure refrigerant flowing into the nozzle portion 15a of the ejector 15 from the branch portion 14 is decompressed and expanded by the nozzle portion 15a in iso-entropy (point $d_5 \rightarrow$point $f_5$), and is jetted from the refrigerant jet port of the nozzle portion 15a. Thus, the refrigerant evaporated in the suction side evaporator 18 is drawn into the ejector 15 from the refrigerant suction port 15a.

In the general operation and the high capacity operation, because the pressure difference $\Delta P$ is larger than the predetermined difference $\Delta KP$ (standard value), a pressure difference between the refrigerant pressure at the refrigerant inlet side of the nozzle portion 15a of the ejector 15 and the refrigerant pressure at the refrigerant outlet side of the nozzle portion 15a can be sufficiently large, so that the refrigerant flowing out of the suction evaporator 18 can be accurately drawn into the ejector 15 from the refrigerant suction port 15c.

Furthermore, the jet refrigerant jetted from the nozzle portion 15a and the suction refrigerant drawn from the refrigerant suction port 15c flow into the diffuser portion 15d of the ejector 15 (point $f_5 \rightarrow$point $g_5$, point $k_5 \rightarrow$point $g_5$ in FIG. 5). That is, the refrigerant passage sectional area is enlarged in the diffuser portion 15d as toward downstream so that the speed energy of the refrigerant is converted to the pressure energy thereof, thereby increasing the pressure of the refrigerant. That is, the jet refrigerant and the suction refrigerant are mixed, thereby increasing the pressure of the mixed refrigerant (point $g_5 \rightarrow$point $h_5$ in FIG. 5).

The refrigerant flowing out of the diffuser portion 15d flows into the discharge side evaporator 16, and is evaporated by absorbing heat from air inside of the vehicle compartment, blown by the blower fan 16a (point $h_5 \rightarrow$point $i_5$ in FIG. 5). The gas refrigerant flowing out of the discharge side evaporator 16 is drawn into the compressor 11, and is compressed again (point $i_5 \rightarrow$point $a_5$ in FIG. 5).

On the other hand, middle-pressure refrigerant flowing from the branch portion 14 toward the throttle portion 17 is decompressed and expanded in iso-enthalpy at the throttle portion 17, thereby reducing the refrigerant pressure (point $e_5 \rightarrow$point $j_5$ in FIG. 5). The refrigerant flowing into the suction side evaporator 18 is evaporated by absorbing heat from air inside of the vehicle compartment, blown by the blower fan 16a (point $j_5 \rightarrow$point $k_5$ in FIG. 5), thereby cooling air to be blown into the vehicle compartment. The refrigerant flowing out of the suction side evaporator 18 is drawn into the ejector 15 from the refrigerant suction port 15c (point $k_5 \rightarrow$point $g_5$ in FIG. 5).

In the above refrigerant cycle device 10, during the generation operation and the high capacity operation, the refrigerant flowing out of the suction side evaporator 18 can be accurately drawn into the ejector 15 from the refrigerant suction port 15c, so as to improve the COP while sufficiently increasing the cooling capacity. In the ejector 15 adapted to the above ejector-type refrigerant cycle device 10, refrigerant is decompressed and expanded in the nozzle portion 15a of the ejector 15 in iso-entropy, and the refrigerant downstream of the suction side evaporator 18 is drawn into the ejector 15 from the refrigerant suction port 15c by refrigerant suction action due to a high-speed refrigerant jetted from the jet port of the nozzle portion 15a, thereby recovering the loss of the kinetic energy in the decompression and expansion of the nozzle portion 15a.

By converting the recovered kinetic energy (hereinafter, referred to as "recovery energy" to the pressure energy in the diffuser portion 15d of the ejector 15, the pressure of the suction refrigerant of the compressor 11 can be increased, thereby reducing the drive power of the compressor 11 and improving the coefficient of performance (COP) in the ejector-type refrigerant cycle device 10. In the above refrigerant cycle device 10, during the generation operation and the high capacity operation, the refrigerant flowing out of the suction side evaporator 18 can be accurately drawn into the ejector 15 from the refrigerant suction port 15c, so as to improve the COP in the general operation and in the high capacity operation.

The recovery energy corresponds to an enthalpy difference ($\Delta H$ of FIG. 5) between the enthalpy of the refrigerant (point $d_5$ of FIG. 5) at the inlet side of the nozzle portion 15a and the enthalpy of the refrigerant (point $f_5$ of FIG. 5) at the outlet side of the nozzle portion 15a.

The air blown by the blower fan 16a flows as in the arrow in FIG. 1. Thus, the air blown by the blower fan 16a passes through the discharge side evaporator 16 and the suction side evaporator 18 in this order, and then flows into the same space to be cooled (e.g., vehicle compartment). At this time, the refrigerant evaporation pressure of the discharge side evaporator 16 becomes in a pressure pressurized by the diffuser portion 15d. On the other hand, the refrigerant evaporation pressure of the suction side evaporator 18 is a pressure immediately after being decompressed by the nozzle portion 15.

Thus, the refrigerant evaporation pressure (refrigerant evaporation temperature) of the suction side evaporator 18 can be made lower than the refrigerant evaporation pressure (the refrigerant evaporation temperature) of the discharge side evaporator 16. Thus, a temperature difference between the blown air and the refrigerant evaporation temperature can be secured in both the discharge side evaporator 16 and the suction side evaporator 18, thereby effectively cooling the blown air.

The branch portion 14 is configured such that the dryness of the refrigerant flowing into the nozzle portion 15a becomes higher than the dryness of the refrigerant flowing into the throttle portion 17, so that the gradient of iso-entropy line becomes small while the refrigerant is decompressed in the nozzle portion 15a in iso-entropy. Thus, when the refrigerant is decompressed in iso-entropy by a predetermined pressure, the enthalpy difference between the enthalpies of the refrigerant at the refrigerant inlet side of the nozzle portion 15a and the refrigerant at the refrigerant outlet side of the nozzle portion 15a can be enlarged, thereby increasing the recovery energy amount.

Next, the refrigerant state in the low capacity operation of the ejector-type refrigerant cycle device 10 will be described with reference to FIG. 6. Regarding the signs indicating the refrigerant states in FIG. 6, the same refrigerant states as in FIG. 5 are indicated by using the same alphabets, but the additional signs behind the alphabets are only changed. As shown in FIG. 6, the refrigerant states of the refrigerant cycle 10 in the low capacity operation are changed basically similarly to the refrigerant states in the generation operation and the high capacity operation.

In the low capacity operation, the refrigerant discharge capacity of the compressor 11 is set approximately zero as described at step S17. Thus, a pressure difference between the refrigerant pressure at the inlet side of the nozzle portion 15a of the ejector 15 and the refrigerant pressure at the outlet side of the nozzle portion 15a of the ejector 15 becomes a residual pressure of the high capacity operation, and thereby the recovery energy ($\Delta H6$ in FIG. 6) becomes greatly small as compared with the recovery energy in the general operation and the high capacity operation ($\Delta H5$ in FIG. 5).

In the above refrigerant cycle device 10, during the low capacity operation, it is difficult for the refrigerant flowing out of the suction side evaporator 18 to be accurately drawn into the ejector 15 from the refrigerant suction port 15c, and thereby it is difficult to reduce the drive power of the compressor 11. Therefore, improvement in the COP of the ejector-type refrigerant cycle device 10 cannot be effectively performed by using the ejector 15.

According to the ejector-type refrigerant cycle device 10 of the present embodiment, when the pressure difference $\Delta P(Pd-Pef)$ is equal to or smaller than the predetermined pressure difference $\Delta KP$, it is determined that the required cooling capacity is larger than a standard value. Thus, in this case, the high capacity operation and the low capacity operation are alternately switched as described in the control operation of steps S15 to S17.

Thus, in the ejector-type refrigerant cycle device 10 having the ejector 15, the refrigerant circulation amount circulating in the refrigerant cycle can be suitably adjusted while the coefficient of performance (COP) can be effectively improved.

That is, in the present embodiment, the standard value of the required capacity is set, such that the ejector 15 has a sufficient refrigerant suction capacity thereby improving the COP. Thus, in the general operation in which the required capacity is larger than the standard value, the refrigerant suction capacity of the ejector 15 can be improved, and the COP can be effectively improved by the ejector 15. Furthermore, in the general operation, the refrigerant circulation amount can be adjusted based on the required capacity, thereby reducing power consumed unnecessarily in the compressor 11.

When the required capacity is equal to or smaller than the standard value, the COP can be accurately increased by using the ejector 15 in the high capacity operation, similarly to the generation operation. When the high capacity operation and the low capacity operation of the compressor 11 are alternately switched, a ratio of the operation time in the low capacity operation to the operation time of the high capacity operation can be adjusted, so that the refrigerant circulation amount can be adjusted in accordance with the required capacity. Thus, it can prevent power from being unnecessarily consumed in the compressor 11, thereby preventing the COP from being reduced.

As a result, the refrigerant suction capacity of the ejector 15 can be increased as compared with the line E1 of FIG. 3, at which the COP can be improved by the ejector 15, regardless of the required capacity. In FIG. 3, E2 shows a refrigerant suction capacity of the ejector 15 when the refrigerant discharge capacity of the compressor 11 is set similarly to that in the general operation, in a case where the required capacity is equal to or lower than the standard value.

In the present embodiment, the high capacity operation and the low capacity operation of the compressor 11 are alternately switched after the high capacity operation and the low capacity operation are respectively continued for predetermined times. Therefore, the refrigerant circulation flow amount can be easily and accurately adjusted. Because the high capacity operation is continued for a predetermined time, the flow amount of the refrigerant circulating in the refrigerant cycle can be made stable, and the refrigerant suction in the ejector 15 from the refrigerant suction port 15c can be stably performed.

In the present embodiment, at step S11, the pressure difference $\Delta P(Pd-Pef)$ is calculated based on the detection value Pd of the high pressure sensor 22 and the refrigerant evaporation pressure Pef in the suction side evaporator 18 calculated from the detection value Te of the evaporator temperature sensor 21. Therefore, it can accurately determine whether the required capacity becomes the standard value.

If an actual suction refrigerant pressure of the compressor 11 or an actual refrigerant evaporation pressure in the suction side evaporator 18 is used as a low-pressure side refrigerant pressure when the pressure difference $\Delta P(Pd-Pef)$ is calculated, the low-pressure side refrigerant pressure is easily varied when the high-pressure operation and the low-pressure operation of the compressor 11 are selectively switched. Thus, it is impossible to suitably determine whether the required capacity in the refrigerant cycle device 10 is equal to or lower than the standard value.

In contrast, the response of the detection value Tef of the evaporator temperature sensor 21 with respect to the suction refrigerant pressure of the compressor 11 is relatively low, and thereby the response of switching between the high capacity operation and the low capacity operation with respect to the suction refrigerant pressure of the compressor 21 is relatively low. Generally, the detection value Tef of the evaporator temperature sensor 21 is a physical amount relative to the heat capacity of the suction side evaporator 18. Because the refrigerant evaporation pressure Pef is calculated based on the detection value Tef of the evaporator temperature sensor 21, which is an example of the physical amount relative to the refrigerant evaporation temperature, a variation range of the pressure difference in accordance with the switching between the high capacity operation of the compressor 11 and the low capacity operation of the compressor 11 can be reduced, and thereby it can suitably determine that the required capacity in the refrigerant cycle device 10 becomes the standard value.

In the refrigerant cycle device 10 of the present embodiment, even when the required capacity is lower than the standard value and the refrigerant circulation amount is decreased, the refrigerant circulation amount can be increased for a time period for which the high capacity operation is operated. Thus, it can restrict lubrication oil circulating together with the refrigerant in the refrigerant cycle from staying in the suction side evaporator 18 or the radiator 12, for example.

Furthermore, the branch portion 14 is configured to adjust the refrigerant state flowing toward the nozzle portion 15a and the refrigerant state flowing toward the throttle portion 17. As a result, a temperature difference of air blown from the evaporator unit 19 toward the vehicle compartment can be reduced.

Second Embodiment

A second embodiment of the invention will be described with reference to FIGS. 7 to 9B.

Figure 7:
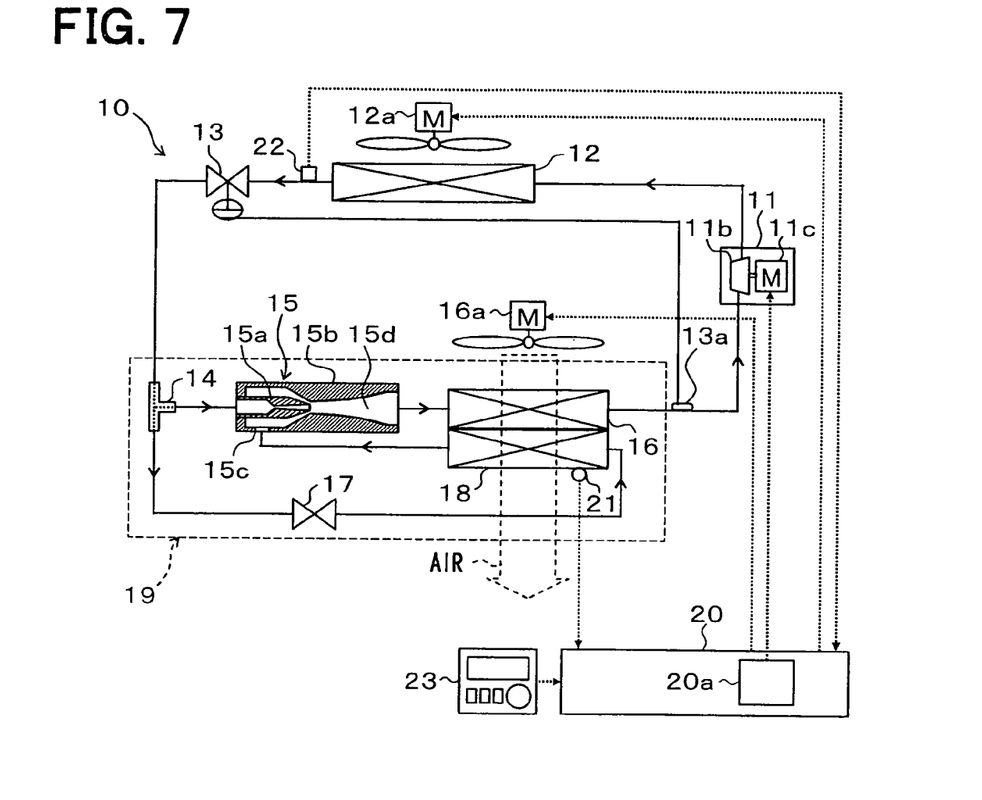
FIG. 7 is an entire schematic diagram of an ejector-type refrigerant cycle device according to a second embodiment of the invention.

In an ejector-type refrigerant cycle device 10 of the second embodiment, the structure of the compressor 11 is changed with respect to the above-described first embodiment. In the second embodiment, as shown in FIG. 7, as the compressor 11, an electrical compressor is adapted, in which a fixed displacement compression mechanism 11b is driven by an electrical motor 11c to have a fixed discharge capacity.

As the fixed-displacement compression mechanism 11b, various compression mechanisms such as a scroll-type compression mechanism, a rolling piston-type compression mechanism, a plunger-type compression mechanism, a vane-type compression mechanism or the like may be used. The operation (e.g., rotational speed) of the electrical motor 11c is controlled by using control signals output from the air conditioning controller 20. As the electrical motor 11c, an AC motor or a DC motor may be used. A refrigerant discharge capacity of the compressor 11 is changed by the rotation speed control. In the ejector-type refrigerant cycle device 10 of the second embodiment shown in FIG. 7, the other components are similar to those of the above-described first embodiment.

In the second embodiment, a basic control of the refrigerant discharge capacity of the compressor 11 is similar to the flow diagram of the above-described first embodiment shown in FIG. 2. In the second embodiment, the rotation speed of the electrical motor 11c is increased by a predetermined amount so that the refrigerant discharge capacity of the compressor 11 is increased at step S13 in FIG. 2. Similarly, the rotation speed of the electrical motor 11c is decreased by a predetermined amount so that the refrigerant discharge capacity of the compressor 11 is decreased at step S14 in FIG. 2. Furthermore, the rotation speed of the electrical motor 11c is maintained so that the refrigerant discharge capacity of the compressor 11 is maintained at step S16 in FIG. 2, and the electrical motor 11c is stopped so that the refrigerant discharge capacity becomes zero at step S17 in FIG. 2.

In the second embodiment, when the operation of the compressor 11 is switched from the high capacity operation to the low capacity operation, the rotation speed of the electrical motor 11c is gradually decreased so that the refrigerant discharge capacity of the compressor 11 is gradually decreased. On the other hand, when the operation of the compressor 11 is switched from the low capacity operation to the high capacity operation, the rotation speed of the electrical motor 11c is gradually increased so that the refrigerant discharge capacity of the compressor 11 is gradually increased.

Figure 8:
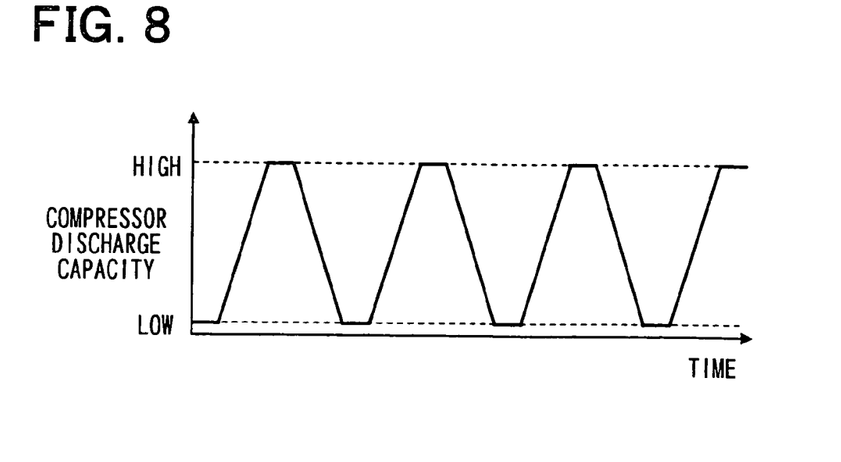
FIG. 8 is a graph showing variation in a refrigerant discharge capacity of a compressor when being switched between a high capacity operation and a low capacity operation, according to an example of the second embodiment.

In the second embodiment, when the required capacity of the ejector-type refrigerant cycle device 10 is lower than the standard value, the high capacity operation and the low capacity operation are alternately switched as in the graph of FIG. 8. When the required capacity is reduced, a ratio of an operation time of the low capacity operation to an operation time of the high capacity operation is increased, thereby reducing the flow amount of the refrigerant circulating in the refrigerant cycle device 10 in accordance with the decrease of the required capacity. In the second embodiment, the other structures and operation of the refrigerant cycle device 10 are similar to those of the above-described first embodiment.

Thus, in the ejector-type refrigerant cycle device 10 of the present embodiment, the COP can be effectively improved by using the ejector 15, regardless of the requirement capacity (e.g., cooling capacity) required in the ejector-type refrigerant cycle device 10.

In the second embodiment, when the high capacity operation and the low capacity operation of the compressor 11 are switched therebetween, the refrigerant discharge capacity of the compressor 11 is gradually changed, and thereby it can prevent the refrigerant circulation amount from being rapidly changed in the ejector-type refrigerant cycle device 10. Because the refrigerant circulation amount is gradually changed when the high capacity operation and the low capacity operation are switched in the ejector-type refrigerant cycle device 10, a noise due to the refrigerant flow can be effectively reduced.

Figure 9A:
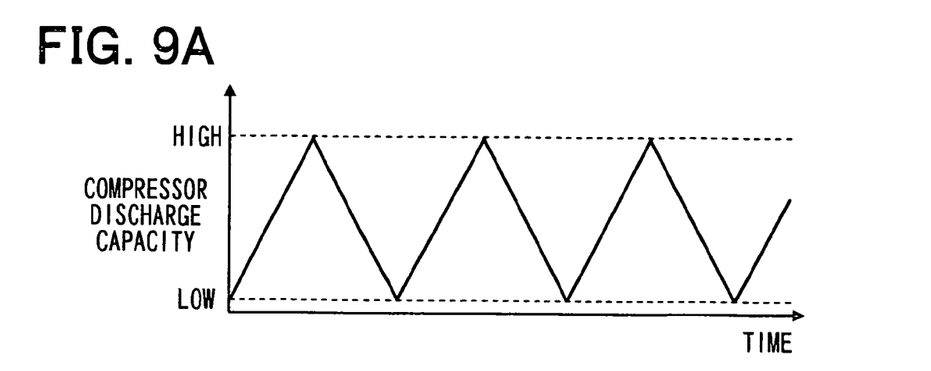
FIGS. 9A and 9B are graphs showing variation in a refrigerant discharge capacity of a compressor when being switched between a high capacity operation and a low capacity operation, according to another examples of the second embodiment.
Figure 9B:
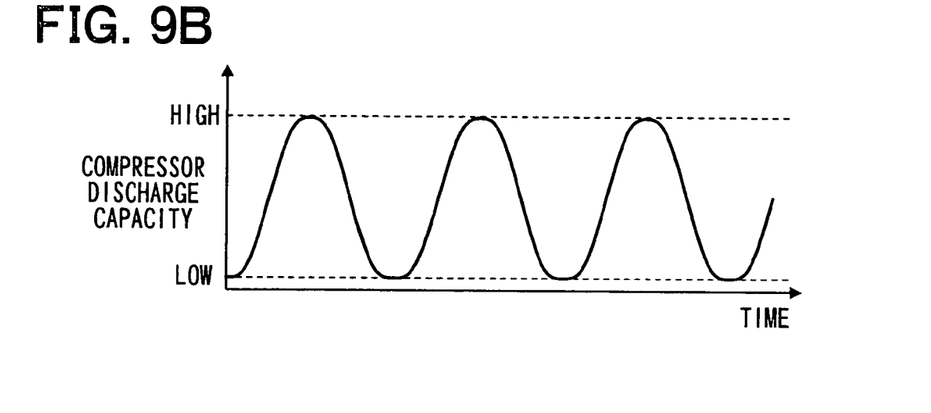

In the example of FIG. 8, the high capacity operation and the low capacity operation are respectively maintained for a time period when the operation of the compressor 11 is switched between the high capacity operation to the low capacity operation. However, the capacity changing patterns of the compressor 11 can be suitably changed without being limited to the graph of FIG. 8. For example, the refrigerant discharge capacity of the compressor 11 can be changed as shown in FIGS. 9A and 9B. In the example of FIG. 9A, the refrigerant discharge capacity of the compressor 11 is changed between the high capacity operation and the low capacity operation, without continuously performing the high capacity operation or the low capacity operation for a predetermined time period. In the example of FIG. 9B, the refrigerant discharge capacity of the compressor 11 is gradually changed even around the high capacity operation or the low capacity operation.

The control operation of the refrigerant discharge capacity of the compressor 11 shown in FIGS. 8, 9A and 9B may be applied to the variable displacement compressor 11 described in the above first embodiment.

The compressor 11 of the second embodiment may be applied to any electrical compressor for a refrigerant cycle device adapted to an electrical vehicle, a hybrid vehicle or the like.

Third Embodiment

A third embodiment of the present invention will be described with reference to FIG. 10.

In the above-described first embodiment, it is determined whether the pressure difference ΔP(Pd–Pef) is equal to or smaller than a predetermined pressure difference ΔKP, thereby determining whether the requirement capacity (e.g., cooling capacity) required in the ejector-type refrigerant cycle device 10 is equal to or smaller than a standard value. However, in the third embodiment, it is determined whether the requirement capacity required in the ejector-type refrigerant cycle device 10 is equal to or smaller than a standard value, by directly using a detection value Pd of the high pressure sensor 22.

Figure 10:
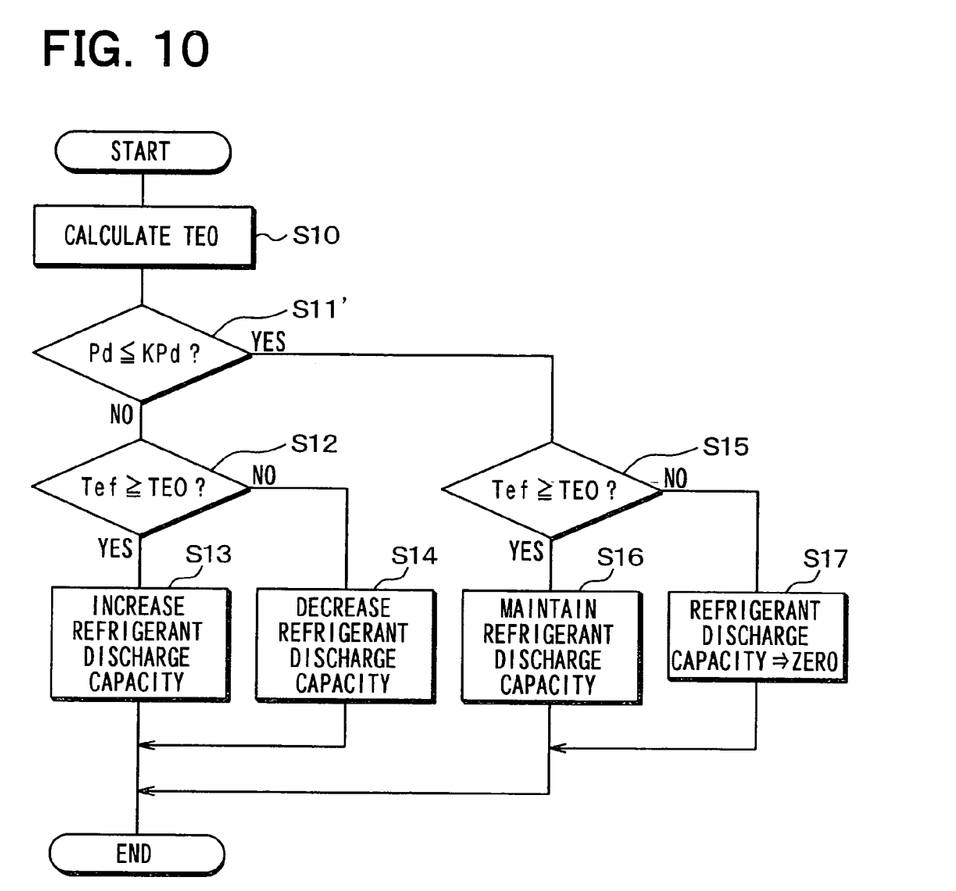
FIG. 10 is a flow diagram showing a part of the control process of the ejector-type refrigerant cycle device according to a third embodiment of the invention.

In the third embodiment, as shown in FIG. 10, step S11' is used instead of step S11 of FIG. 2. Specifically, at step S11', it is determined whether the detection value Pd of the high pressure sensor 22 is equal to or lower than a predetermined pressure KPd.

When the refrigerant discharge capacity of the compressor 11 is decreased in accordance with a decrease of the required capacity, the refrigerant pressure at the high-pressure side is decreased. Therefore, the refrigerant pressure Pd detected by the high pressure sensor 22 is an example of an index for indicating the required capacity in the ejector-type refrigerant cycle device 10.

At step S11', it is determined whether the refrigerant pressure Pd is equal to or smaller than the predetermined pressure KPd, thereby determining whether the required capacity (e.g., cooling capacity) required in the ejector-type refrigerant cycle device 10 is equal to or smaller than a standard value. Other configurations and operation of the present embodiment are similar to those of the above-described first or second embodiment.

Thus, in the ejector-type refrigerant cycle device 10 of the present embodiment, the COP can be effectively improved by using the ejector 15, regardless of the requirement capacity (e.g., cooling capacity, heating capacity) required in the ejector-type refrigerant cycle device 10.

In the third embodiment, it is determined whether the refrigerant pressure Pd detected by the high pressure sensor 22 is equal to or smaller than the predetermined pressure KPd. Therefore, it is possible to easily determine whether the required capacity (e.g., cooling capacity, heating capacity) required in the ejector-type refrigerant cycle device 10 is equal to or smaller than the standard value.

Other Embodiments

The present invention can be changed variously as follows within a scope of the present invention, without being limited to the above embodiments.

In the above-described embodiments, the evaporator temperature sensor 21 is disposed to detect a fin temperature of the heat exchanging portion, thereby detecting a physical amount relative to the refrigerant evaporation temperature. However, a temperature detector other than the evaporator temperature sensor 21 may be used to detect the physical amount relative to the refrigerant evaporation temperature.

For example, a temperature detector may be located at a position of the suction side evaporator 18, other than the fin of the heat exchanging portion. Alternatively, a refrigerant temperature for directly directing the temperature of the refrigerant flowing in the suction side evaporator 18 may be used as the temperature detector. Furthermore, a temperature detector may be arranged to detect the temperature of air immediately after passing through the suction side evaporator 18.

In the above-described embodiments, the high pressure sensor 22 is disposed in a high-pressure refrigerant passage from the refrigerant discharge port of the compressor 11 to the refrigerant inlet of the expansion valve 13, so as to detect the pressure of the high-pressure side refrigerant. However, a pressure detector may be provided in a high pressure refrigerant passage from the refrigerant discharge port of the compressor 11 to a refrigerant inlet of the radiator 12, or within the radiator 12, so as to detect the pressure of the high-pressure side refrigerant before being decompressed.

In the above-described embodiments, the ejector-type refrigerant cycle device 10 is provided with the branch portion 14 in which the refrigerant flowing out of the expansion valve 13 is branched such that one refrigerant stream branched at the branch portion 14 is decompressed in the nozzle portion 15a of the ejector 15 and the other refrigerant stream branched at the branch portion 14 is decompressed in the throttle portion 17. However, the present invention may be applied to other ejector-type refrigerant cycle devices without being limited to the above refrigerant cycle device 10.

For example, an inner heat exchanger may be provided in the ejector-type refrigerant cycle device 10 to perform heat exchange between a low-pressure refrigerant to be drawn into the compressor 11 and a high-pressure refrigerant flowing out of the radiator 12. Furthermore, the discharge side evaporator 16 may be omitted from the ejector-type refrigerant cycle device 10.

Alternatively/Furthermore, a gas-liquid separator may be provided to separate the refrigerant flowing out of the discharge side evaporator 16 into gas refrigerant and the liquid refrigerant. In this case, the gas refrigerant separated at the gas-liquid separator may be drawn into the compressor 11, and the liquid refrigerant separated at the gas-liquid separator may be drawn into the suction side evaporator 18. Alternatively, the discharge side evaporator 16 may be omitted, and a gas-liquid separator may be located downstream of the diffuser portion 15d of the ejector 15 so that the refrigerant flowing out of the diffuser portion 15 of the ejector 15 can directly flow into the gas-liquid separator.

In addition, a low-pressure side branch portion may be provided at a downstream side of the diffuser portion 15d of the ejector 15 to branch a flow of the refrigerant flowing out of the diffuser portion 15d of the ejector 15. Furthermore, the low-pressure side branch portion is provided, such that one refrigerant branched at the low-pressure side branch portion flows into the discharge side evaporator 16, and the other refrigerant branched at the low-pressure side branch portion flows toward the suction side evaporator 18.

In the above-described embodiments, the refrigerant discharge capacity of the compressor 11 in the general operation is set as the standard value, so that the refrigerant discharge capacity of the compressor 11 can be maintained at least at the requirement capacity in the high capacity operation. However, the standard value may be set larger than the requirement capacity required in the general operation.

In the above-described embodiments, in the low capacity operation, the refrigerant discharge capacity of the compressor 11 is set at approximately zero. However, in the low capacity operation, the refrigerant discharge capacity of the compressor 11 may be set at a predetermined capacity that is lower than the standard value and is higher than zero.

The above-described embodiment has been an example in which the ejector-type refrigerant cycle device 10 of the present invention is applied to a vehicular air conditioner, but the application of the present invention is not limited to this. For example, the ejector-type refrigerant cycle device 10 of the present invention may be adapted to an air conditioner for a fixed room, a refrigerator or the like.

In the above-described embodiments, the discharge side evaporator 16 and the suction side evaporator 18 are integrally arranged to cool the same space to be air conditioned (e.g., vehicle compartment). However, the discharge side evaporator 16 and the suction side evaporator 18 may be arranged separately to cool respectively different spaces to be air conditioned. Because the refrigerant evaporation pressure (refrigerant evaporation temperature) of the discharge side evaporator 16 is higher than the refrigerant evaporation pressure (refrigerant evaporation temperature) of the suction side evaporator 18, the suction side evaporator 18 may be used to cool a freezing space of a refrigerator, and the discharge side evaporator 16 may be used to cool a refrigerating space of the refrigerator.

In the above-described embodiment has been an example in which the usual fluorocarbon-based refrigerant is employed as the refrigerant, but the kind of the refrigerant is not limited to this. For example, hydrocarbon-based refrigerant, carbon dioxide, etc. may be used. Furthermore, the ejector-type refrigerant cycle device 10 of the present invention may be configured to form a vapor-compression super-critical refrigerant cycle in which a refrigerant pressure on the high-pressure side exceeds the critical pressure of the refrigerant.

In the above-described ejector-type refrigerant cycle device 10, the radiator 12 is adapted as an exterior heat exchanger in which the refrigerant is heat exchanged with outside air, and the discharge side evaporator 16 and the suction side evaporator 18 are adapted as an interior heat exchanger (using-side heat exchanger) for cooling air to be blown into the vehicle compartment. However, the present invention may be applied to a heat pump cycle, in which the discharge side evaporator 16 and the suction side evaporator 18 are configured as the exterior heat exchanger to absorb heat from a heat source such as the atmosphere, and the radiator 12 may be configured as the interior heat exchanger for heating the refrigerant that is used to heat air or water to be heated. In this case, the requirement capacity required in the ejector-type refrigerant cycle device 10 is a heating capacity for heating a fluid to be heated.

Although the present invention has been fully described in connection with the preferred embodiments thereof with reference to the accompanying drawings, it is to be noted that various changes and modifications will become apparent to those skilled in the art.

For example, according to an aspect of the above-described embodiments and modifications, in the ejector-type refrigerant cycle device 10 with the ejector 15, the discharge capacity control portion 20a increases the refrigerant discharge capacity of the compressor 11 in accordance with an increase of a requirement capacity required in a refrigerant cycle of a general operation, when the requirement capacity is larger than a standard value. In contrast, when the requirement capacity required in the refrigerant cycle is equal to or smaller than the standard value, the discharge capacity control portion 20a controls the refrigerant discharge capacity of the compressor 11 to be switched alternately between a high capacity operation in which the refrigerant discharge capacity of the compressor 11 is larger than a predetermined discharge capacity that is determined at the standard value of the requirement capacity in the general operation, and a low capacity operation in which the refrigerant discharge capacity of the compressor 11 is lower than the predetermined discharge capacity.

Thus, even when the requirement capacity required in the refrigerant cycle is equal to or lower than the standard value, the COP of the ejector-type refrigerant cycle device 10 can be effectively increased by using the ejector 15, regardless of the requirement capacity of the refrigerant cycle. For example, the requirement capacity of the refrigerant cycle is a cooling capacity when the ejector-type refrigerant cycle device 10 is used for cooling a fluid to be cooled, or the requirement capacity of the refrigerant cycle is a heating capacity when the ejector-type refrigerant cycle device 10 is used for heating a fluid to be heated. Furthermore, the refrigerant discharge capacity of the compressor 11 may be controlled by controlling an operation time of the compressor 11 or an operation ratio of the compressor 11, for example.

The discharge capacity control portion 20a may continuously perform at least one of the high capacity operation and the low capacity operation for a predetermined time, when the high capacity operation and the low capacity operation are alternately switched. Thus, the refrigerant circulation amount in the refrigerant cycle device 10 can be suitably adjusted in accordance with the requirement capacity required in the refrigerant cycle device 10.

Furthermore, the discharge capacity control portion 20a may gradually decrease the refrigerant discharge capacity of the compressor 11 when operation of the compressor 11 is switched from the high capacity operation to the low capacity operation, and may gradually increase the refrigerant discharge capacity of the compressor 11 when the operation is switched from the low capacity operation to the high capacity operation.

The ejector-type refrigerant cycle device 10 may be provided with a high pressure detector 22 configured to detect a physical amount relative to a pressure of a high-pressure refrigerant in the refrigerant cycle, an evaporator temperature detector 21 configured to detect a physical amount relative to a refrigerant evaporation temperature in the suction side evaporator 18, and a calculation portion 20 configured to calculate a refrigerant evaporation pressure in the suction side evaporator 18 based on a detection value of the evaporator temperature detector 21. In this case, the discharge capacity control portion 20a determines that the requirement capacity required in the refrigerant cycle device 10 is equal to or smaller than the standard value when a pressure difference $\Delta P$ between a detection value Pd of the high pressure detector 22 and the refrigerant evaporation pressure Pef in the suction side evaporator 18 is smaller than a predetermined value.

Alternatively, the discharge capacity control portion 20a may determine that the requirement capacity required in the refrigerant cycle device 10 is equal to or smaller than the standard value, when a detection value Pd of the high pressure detector 22 is smaller than a predetermined value KPd.

Such changes and modifications are to be understood as being within the scope of the present invention as defined by the appended claims.

What is claimed is:

1. An ejector-type refrigerant cycle device comprising:
   a compressor configured to compress and discharge refrigerant;
   a radiator disposed to cool the refrigerant discharged from the compressor;
   an ejector that includes a nozzle portion in which the refrigerant flowing from the radiator is decompressed, a refrigerant suction port from which refrigerant is drawn by a high-speed refrigerant jetted from the nozzle portion, and a pressure increasing portion in which the refrigerant jetted from the nozzle portion and the refrigerant drawn from the refrigerant suction portion are mixed and pressurized;

a suction side evaporator disposed to evaporate the refrigerant to be drawn into the refrigerant suction port of the ejector;

a discharge capacity control portion configured to control a refrigerant discharge capacity of the compressor;

a high pressure detector configured to detect a physical amount relative to a pressure of a high-pressure refrigerant in the refrigerant cycle;

an evaporator temperature detector configured to detect a physical amount relative to a refrigerant evaporation temperature in the suction side evaporator; and a calculation portion configured to calculate a refrigerant evaporation pressure in the suction side evaporator based on a detection value of the evaporator temperature detector, wherein the discharge capacity control portion increases the refrigerant discharge capacity of the compressor in accordance with an increase of a requirement capacity required in a refrigerant cycle of a general operation, when the requirement capacity is larger than a standard value, when the requirement capacity required in the refrigerant cycle is equal to or smaller than the standard value, the discharge capacity control portion controls the refrigerant discharge capacity of the compressor to be switched alternately between a high capacity operation in which the refrigerant discharge capacity of the compressor is larger than a predetermined discharge capacity that is determined at the standard value of the requirement capacity in the general operation, and a low capacity operation in which the refrigerant discharge capacity of the compressor is lower than the predetermined discharge capacity; and the discharge capacity control portion determines that the requirement capacity required in the refrigerant cycle is equal to or smaller than the standard value when a pressure difference between a detection value of the high pressure detector and the refrigerant evaporation pressure in the suction side evaporator is smaller than a predetermined value.

2. The ejector-type refrigerant cycle device according to claim 1, wherein the discharge capacity control portion continuously performs at least one of the high capacity operation and the low capacity operation for a predetermined time, when the high capacity operation and the low capacity operation are alternately switched.

3. The ejector-type refrigerant cycle device according to claim 1, wherein the discharge capacity control portion gradually decreases the refrigerant discharge capacity of the compressor when the operation is switched from the high capacity operation to the low capacity operation, and gradually increases the refrigerant discharge capacity of the compressor when the operation is switched from the low capacity operation to the high capacity operation.

4. An ejector-type refrigerant cycle device comprising:
a compressor configured to compress and discharge refrigerant;
a radiator disposed to cool the refrigerant discharged from the compressor;
an ejector that includes a nozzle portion in which the refrigerant flowing from the radiator is decompressed, a refrigerant suction port from which refrigerant is drawn by a high-speed refrigerant jetted from the nozzle portion, and a pressure increasing portion in which the refrigerant jetted from the nozzle portion and the refrigerant drawn from the refrigerant suction portion are mixed and pressurized;

a suction side evaporator disposed to evaporate the refrigerant to be drawn into the refrigerant suction port of the ejector;

a discharge capacity control portion configured to control a refrigerant discharge capacity of the compressor; and a high pressure detector configured to detect a physical amount relative to a pressure of a high-pressure refrigerant in the refrigerant cycle, wherein the discharge capacity control portion increases the refrigerant discharge capacity of the compressor in accordance with an increase of a requirement capacity required in a refrigerant cycle of a general operation, when the requirement capacity is larger than a standard value, when the requirement capacity required in the refrigerant cycle is equal to or smaller than the standard value, the discharge capacity control portion controls the refrigerant discharge capacity of the compressor to be switched alternately between a high capacity operation in which the refrigerant discharge capacity of the compressor is larger than a predetermined discharge capacity that is determined at the standard value of the requirement capacity in the general operation, and a low capacity operation in which the refrigerant discharge capacity of the compressor is lower than the predetermined discharge capacity; and the discharge capacity control portion determines that the requirement capacity required in the refrigerant cycle is equal to or smaller than the standard value, when a detection value of the high pressure detector is smaller than a predetermined value.

5. The ejector-type refrigerant cycle device according to claim 4, wherein the discharge capacity control portion continuously performs at least one of the high capacity operation and the low capacity operation for a predetermined time, when the high capacity operation and the low capacity operation are alternately switched.

6. The ejector-type refrigerant cycle device according to claim 4, wherein the discharge capacity control portion gradually decreases the refrigerant discharge capacity of the compressor when the operation is switched from the high capacity operation to the low capacity operation, and gradually increases the refrigerant discharge capacity of the compressor when the operation is switched from the low capacity operation to the high capacity operation.

7. An ejector-type refrigerant cycle device comprising:
a compressor configured to compress and discharge refrigerant;
a radiator disposed to cool the refrigerant discharged from the compressor;
an ejector that includes a nozzle portion in which the refrigerant flowing from the radiator is decompressed, a refrigerant suction port from which refrigerant is drawn by a high-speed refrigerant jetted from the nozzle portion, and a pressure increasing portion in which the refrigerant jetted from the nozzle portion and the refrigerant drawn from the refrigerant suction portion are mixed and pressurized;

a suction side evaporator disposed to evaporate the refrigerant to be drawn into the refrigerant suction port of the ejector; and a discharge capacity control portion configured to control a refrigerant discharge capacity of the compressor, wherein the discharge capacity control portion increases the refrigerant discharge capacity of the compressor in accordance with an increase of a requirement capacity required in a refrigerant cycle of a general operation, when the requirement capacity is larger than a standard value, when the requirement capacity required in the refrigerant cycle is equal to or smaller than the standard value, the discharge capacity control portion controls the refrigerant discharge capacity of the compressor to be switched alternately between a high capacity operation in which the refrigerant discharge capacity of the compressor is larger than a predetermined discharge capacity that is determined at the standard value of the requirement capacity in the general operation, and a low capacity operation in which the refrigerant discharge capacity of the compressor is lower than the predetermined discharge capacity; and the discharge capacity control portion controls a ratio between a time period for which the high capacity operation is performed and a time period for which the low capacity operation is performed, in accordance with the requirement capacity required in the refrigerant cycle.

8. The ejector-type refrigerant cycle device according to claim 7, wherein the discharge capacity control portion continuously performs at least one of the high capacity operation and the low capacity operation for a predetermined time, when the high capacity operation and the low capacity operation are alternately switched.

9. The ejector-type refrigerant cycle device according to claim 7, wherein the discharge capacity control portion gradually decreases the refrigerant discharge capacity of the compressor when the operation is switched from the high capacity operation to the low capacity operation, and gradually increases the refrigerant discharge capacity of the compressor when the operation is switched from the low capacity operation to the high capacity operation.

* * * * *